United States Patent

Knox

(10) Patent No.: US 6,747,612 B1
(45) Date of Patent: Jun. 8, 2004

(54) HEAD-UP DISPLAY

(75) Inventor: Andrew Ramsay Knox, Kilbirnie (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/481,357

(22) Filed: Jan. 12, 2000

(30) Foreign Application Priority Data

Mar. 31, 1999 (GB) ................................................ 9907292

(51) Int. Cl.⁷ ................................................ G09G 5/00
(52) U.S. Cl. .................................. 345/8; 345/7; 345/102
(58) Field of Search .............................. 345/7, 8, 175, 345/102; 359/630; 348/51; 351/49; 358/302; 313/495

(56) References Cited

U.S. PATENT DOCUMENTS

| | | | | |
|---|---|---|---|---|
| 4,923,288 A | | 5/1990 | Allen et al. ................ 350/355 |
| 4,935,820 A | * | 6/1990 | Patel et al. ................ 358/302 |
| 5,546,227 A | * | 8/1996 | Yasugaki et al. ........... 359/630 |
| 5,621,424 A | | 4/1997 | Shimada et al. |
| 5,841,507 A | * | 11/1998 | Barnes ...................... 351/49 |
| 5,900,849 A | * | 5/1999 | Gallery ...................... 345/8 |
| 6,031,328 A | * | 2/2000 | Nakamoto .................. 313/495 |
| 6,040,945 A | * | 3/2000 | Karasawa ................... 359/630 |
| 6,091,405 A | * | 7/2000 | Lowe et al. ................ 345/175 |
| 6,151,061 A | * | 11/2000 | Tokuhashi ................... 348/51 |
| 6,268,843 B1 | * | 7/2001 | Arakawa ..................... 345/102 |

FOREIGN PATENT DOCUMENTS

EP 0 326 323 A2 8/1989 ............ G09G/3/00

OTHER PUBLICATIONS

M.G. Tomilin et al., *New Eyeglass Systems with Local Light Protection from Blinding Objects*, J. Opt. Technol. 64 (5), May 1997, pp. 489–492.

* cited by examiner

*Primary Examiner*—Steven Saras
*Assistant Examiner*—Uchendu O. Anyaso
(74) *Attorney, Agent, or Firm*—F. Chau & Associates LLC

(57) ABSTRACT

An improved head-up display enables a user to view a light emitting display and an ambient environment simultaneously. The improved display comprises a light-transmissive block allowing the transmission of light from the ambient environment to the user's eye through the block from a first surface to a second surface opposing the first surface. A light emitting display is located on a third surface of the block, the third surface being substantially perpendicular to the first and second surfaces. A beam splitter has a plane surface arranged at substantially 45 degrees to the first and second surfaces, so as to reflect light from the light emitting display through the second surface. A shutter is located on the first surface and is adapted to block the transmission of light from the ambient environment to the user's eye. This provides a dark background for the light emitting display.

14 Claims, 2 Drawing Sheets

HEAD-UP DISPLAY

FIELD OF THE INVENTION

The present invention relates to a head-up computer display and in particular to a head-up computer display having an increased contrast range and/or an increased range of colours that may be displayed.

BACKGROUND OF THE INVENTION

So-called "head-up" displays are well known in many different areas of usage. An early usage of such head-up displays was for the presentation of flight, navigation and weapon information in an aircraft pilot's line of sight. This allows the pilot to see such information whilst also looking in the direction of travel of the aircraft.

Wearable computing is an effort to make computers a totally integral part of our everyday lives by embedding computers into our clothing such as, for example, shoes, or by arranging computers that can be used like clothing, for example, sunglasses. This level of access to computation will revolutionise the applications for which computers are used. Typically, such computers are about the size of a palmtop computer with wires that attach to a display that sits in front of one or both eyes.

The display for a wearable computer is a head up type. The image is projected into the eye from a small display transducer such as a liquid crystal display (LCD) that is worn on the head. A deliberate design feature of this is that the user is able to see "through" the display to the environment behind, such as the office, home, outdoors and the like. The projected image from the wearable computer is added onto the user's view of the environment and the projected image appears to "float" in space.

This works well for many projected images, but has the disadvantage that the maximum available contrast is determined by the ambient environment behind the projected image. For dark ambient environments the contrast range will be relatively high. However, in for example, brightly lit offices, the contrast range will be severely limited. Additionally, the display cannot show any black areas of the image as black. In order to display black, the liquid crystal display tries to entirely prevent the light from the backlight from being seen by the user, so no light image is projected at these points and thus the ambient light level predominates. Additionally, for a colour display, such an arrangement has the disadvantage that it cannot display low level primary (red, green or blue) or secondary (cyan, magenta, yellow) colours. Consequently, the visibility is determined by the ambient environment. For example, if such a display is used in a room with a predominantly red background, difficultly would be experienced in distinguishing low level red data generated by the display.

FIG. 1 shows a prior art display 100 for a wearable computer. The primary image source is a small LCD 102 with its own backlight. The image produced by the LCD 102 travels through a transparent block 104 (typically made of perspex or glass), through a beam splitter 106 and impinges on a mirror 108 at the end of the block. It is reflected from the mirror 108 and hits the beam splitter 106 again, where it is merged with the incoming light 110 from the environment and reaches the user's eye 112.

This inability to display black or low intensity colours has far-reaching implications for the application of such displays to wearable computers. An extension to the display of FIG. 1 is to add a second display for the other eye. Since each eye may receive a different image, there is potential for stereoscopic or "3D" images, that is, the images can have perceived depth. However, without some means of displaying dark colours, the contrast ratio is so reduced as to limit the usefulness and effectiveness of such a system in all but the darkest environments.

M G Tomilin, A P Onokhov, N T Firsov, "New eyeglass systems with local light protection from blinding objects", J. Opt. Technol. (USA) Vol.64, No.5 May 1997 P489–92 discloses modifications of eyeglasses with local light protection of an observer's eyes from blinding objects, based on the use of space time light modulators using liquid crystals operating in the transmission and reflection regimes. The purpose is to use a display device to replace conventional welding goggles. The object to be welded is viewed through an LCD and the visual field is light, enabling the welder easily to view the surroundings. When an arc is struck, its position in the visual field is identified by means of a photoconductor, using a beam-splitting device and the LCD is made opaque in that area, protecting the welder's eyes.

So it would be desirable to provide an ability to display black or low intensity colours on the displays of wearable computers.

SUMMARY OF THE INVENTION

Accordingly, the present invention provides a display enabling a user to view a light emitting display and an ambient environment simultaneously, the display comprising: a light-transmissive block allowing the transmission of light from the ambient environment to the user's eye through the block from a first surface to a second surface opposing said first surface; a light emitting display located on a third surface of the block, the third surface being substantially perpendicular to said first and second surfaces; a beam splitter having a plane surface arranged at substantially 45 degrees to said first and second surfaces, so as to reflect light from the light emitting display through the second surface; and a shutter, located on said first surface, adapted to block the transmission of light from the ambient environment to the user's eye, for providing a dark background for the light emitting display.

This has the advantage that when a dark area is displayed on the light emitting display, the user sees a dark area instead of seeing the light from the ambient environment without a superimposed display.

Preferably, the display further comprises a mirror located on a fourth surface of the block, the fourth surface opposing said third surface.

In another embodiment, the shutter blocks the transmission of light from the ambient environment to the user's eye when a dark background is selected for a window of a windowed operating system. Typically, the backgrounds of text applications and of computer games may be dark and so the present invention provides the advantage that these backgrounds are correctly displayed.

Another embodiment has the shutter adapted to block the transmission of light from the ambient environment to the user's eye over the entire area of the shutter, thereby simulating a conventional desktop display.

Another embodiment has the shutter adapted to allow the transmission of light from the ambient environment to the user's eye over the entire area of the shutter, thereby simulating a conventional head up display.

In an alternative embodiment, for each portion of the screen, the transmission of the shutter is directly dependent on the intensity of the light emitting display for that portion of the screen. This has the advantage of providing an enhanced contrast ratio for intermediate intensity levels.

Preferably, the shutter is arranged so as to be coincident with the image from the light emitting display.

Further preferably, the shutter has a number of pixels equal to that of the light emitting display, the pixels having the same apparent size as those of the light emitting display.

In an embodiment, the light transmission of the light-transmissive block outside the pre-defined area of the shutter is substantially greater than the light transmission of the shutter in its open state. This has the advantage that the user is aware of where the background of the projected image is, regardless of the background intensity of that projected image.

The invention also provides a display system comprising a display as described above for each of the eyes of a user.

BRIEF DESCRIPTION OF THE DRAWINGS

Embodiments of the invention will now be described, by way of example, with reference to the accompanying drawings, in which.

DETAILED DESCRIPTION OF THE INVENTION

Figure 2:
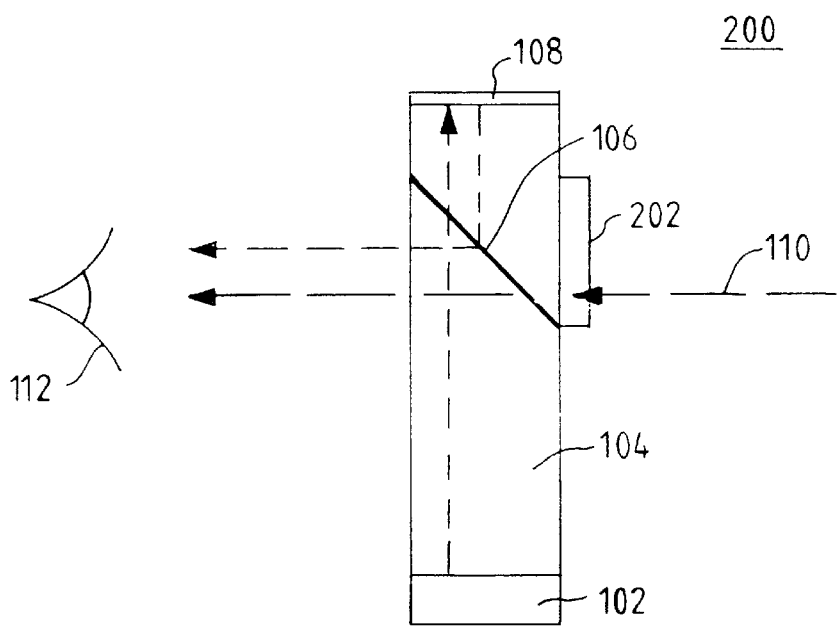
FIG. 2 shows a wearable computer display incorporating the present invention.

FIG. 2 shows a display 200 for a wearable computer. The primary image source is a small LCD 102 with its own backlight. The image produced by the LCD 102 travels through a transparent block 104 (typically made of perspex, or glass), through a beam splitter 106 and impinges on a mirror 108 at the end of the block. It is reflected from the mirror 108 and hits the beam splitter 106 again, where it is merged with the incoming light 110 from the environment and reaches the user's eye 112. Light may also be reflected directly into the user's eye 112 from the beam splitter 106. The display 200 of FIG. 2 may be located anywhere within the user's field of vision with the LCD 102 being above, below, or at either side of the user's line of sight.

Figure 1:
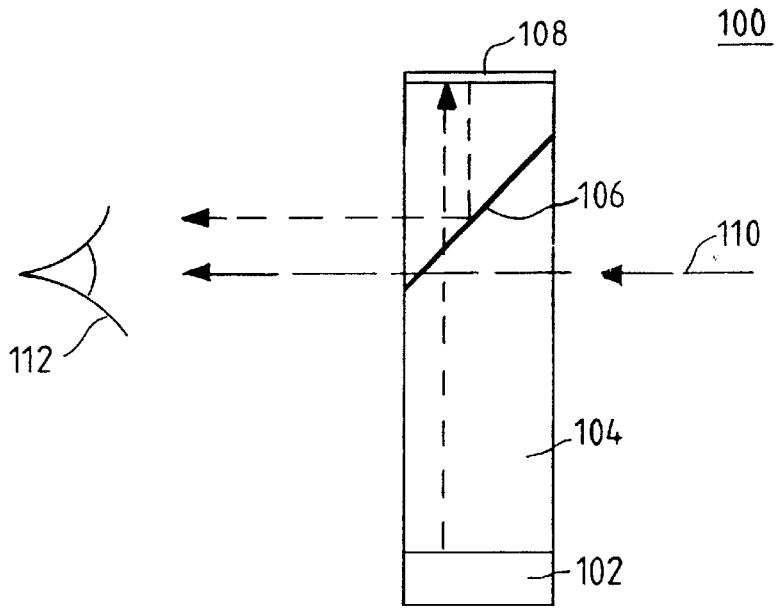
FIG. 1 shows a prior art wearable computer display.

The display has a "shutter" 202 added to the prior art display of FIG. 1 such that, at the appropriate locations, ambient light 110 from the user's environment is blocked. In this way, the display 200 is enhanced such that it can display dark shades/colours and the contrast ratio is improved.

In an embodiment for text applications, a window arrangement is used with the user free to select almost any foreground/background colour scheme desired for the application. Computer games frequently employ a dark background and since one of the common applications for a wearable computer is for games, the present invention provides an enhanced display for such computer games.

The shutter 202 of FIG. 2 does not have to display information content. It simply has to provide a light-blocking or a light transmission function over a defined region. Since the placement of a window is normally only varied occasionally, activation of the shutter function may quite slow, for example, it may take some tens of milliseconds. The shutter 202 needs to be position addressable, such that particular locations in the shutter 202 can be made "dark" and other locations in the shutter 202 can be made "light". The addressability will typically correspond to the addressability of the LCD 102. The shutter 202 only needs to have two states, a dark state and a light state and does not need to be capable of being in any intermediate states.

When used with a monochrome display 102, the shutter is in the open state unless the display 102 is displaying a black area of the screen, when the area of the shutter corresponding to the black area of the screen is closed. So the intensities displayed on a monochrome display range from a bright image at maximum intensity from the display 102 with the shutter open through a low intensity from the display 102 with the shutter open to a zero intensity from the display 102 with the shutter closed.

When used with a colour display 102, the shutter is in the open state unless the display 102 is displaying a low intensity area of the screen, such as a text window in a graphical user interface (GUI) when the shutter is closed. So the intensities of a primary colours (red, green or blue) displayed on a colour display range from a bright image at maximum intensity from the display 102 with the shutter open through a low intensity from the display 102 with the shutter open to a zero intensity from the display 102 with the shutter closed.

In an alternative embodiment, the shutter is capable of being in intermediate states, the level of transmission of the shutter being varied such that a dark state corresponds to the display of black on a display screen and a light state corresponds to the display of white on a display, intermediate intensity levels on the display resulting in intermediate levels of transmissions of the shutter. This embodiment is equally applicable to monochrome or colour displays.

The shutter needs to provide minimal transmission loss when in the "light" state so as not to obscure the passage of ambient light excessively. An LCD can be used as the shutter. A guest-host LCD is able to achieve greater than 60% transmittance in the light state, thus allowing ambient light to reach the user's eye. A guest-host LCD is also able to achieve a transmittance of about 4% in the dark state, thus enabling dark areas to be satisfactorily displayed. The transmission loss in the open state advantageously serves to delineate the boundary of the computer image within the environment. The area of the user's vision outside the area occupied by the shutter and display should have a light transmission greater than that of the shutter in its open state.

U.S. Pat. No. 4,923,288 discloses an optical modulator which may be used as a shutter in place of the liquid crystal display.

The shutter 202 and the LCD 102 should be located such that the image projected by the LCD 102 and the dark state areas of the shutter 202 appear co-incident. The shutter should have a number of pixels equal to that of the light emitting display, the pixels then having the same apparent size as those of the light emitting display.

The shutter 202 can be left in a permanently "closed" state, that is a low transmission state, to provide an effect similar to use of today's desktop and laptop displays. Alternatively, the shutter 202 can be left in a permanently open state, that is a high transmission state, to provide an effect similar to that of a conventional head-up display.

If multiple displays are used, for example, one display for each eye, then a shutter 202 for each of the separate displays may be used.

Figure 3:
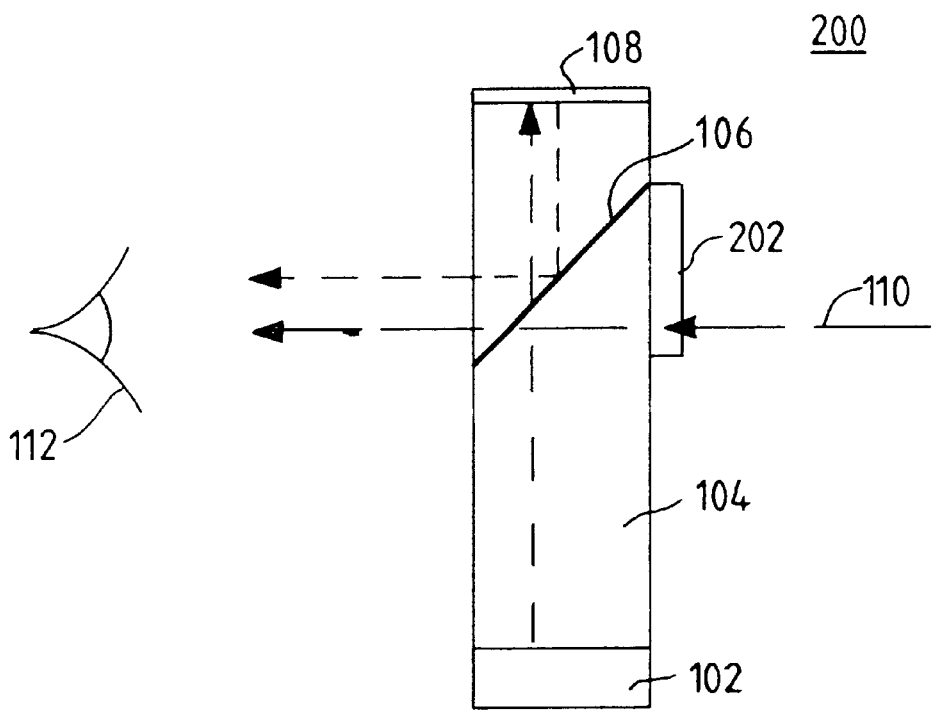
FIG. 3 shows an alternative embodiment of a wearable computer display incorporating the present invention.

FIG. 3 shows a variation of the embodiment of FIG. 2, in which the beam splitter 106 is positioned on the opposite diagonal to that of the embodiment of FIG. 2.

What is claimed is:

1. A display enabling a user to view a light emitting display and an ambient environment simultaneously, the display comprising:
   a light-transmissive block allowing the transmission of light from the ambient environment to the user's eye through the block from a first surface to a second surface opposing, said first surface;
   a light emitting display located on a third surface of the block, the third surface being substantially perpendicular to said first and second surfaces;
   a beam splitter having a plane surface arranged at substantially 45 degrees to said first and second surfaces, so as to reflect light from the light emitting display through the second surface; and
   a shutter, located on said first surface, adapted to block, within a pre-defined within a pre-defined area, the transmission of light from the ambient environment to the user's eye environment to the user's eye, for providing a dark background for the light emitting display, wherein the shutter is addressable for varying a level of light transmission into the light-transmissive block, having a plurality of addresses, wherein each address varies the level of light transmission according to a corresponding address of the light emitting display.

2. A display as claimed in claim 1 further comprising:
   a mirror located on a fourth surface of the block, the fourth surface opposing said third surface.

3. A display as claimed in claim 1 wherein the light emitting display is a liquid crystal display having a backlight.

4. A display as claimed in claim 1 wherein the shutter blocks the transmission of light from the ambient environment to the user's eye when a dark background is selected for a window of a windowed operating system.

5. A display as claimed in claim 1 wherein the shutter is a liquid crystal display.

6. A display as claimed in claim 1 wherein the shutter is an optical modulator.

7. A display as claimed in claim 1, wherein the shutter is adapted to block the transmission of light from the ambient environment to the user's eye over the entire area of the shutter, thereby simulating a conventional desktop display.

8. A display as claimed in claim 1, wherein the shutter is adapted to allow the transmission of light from the ambient environment to the user's eye over the entire area of the shutter, thereby simulating a conventional head up display.

9. A display as claimed in claim 1, wherein for each portion of the screen, the transmission of the shutter is dependent on the intensity of the light emitting display for that portion of the screen.

10. A display as claimed in claim 1 wherein the shutter is arranged so as to be coincident with the image from the light emitting display.

11. A display as claimed in claim 10 wherein the shutter has a number of pixels equal to that of the light emitting display, the pixels having the same apparent size as those of the light emitting display.

12. A display as claimed in claim 1 wherein the light transmission of the light-transmissive block outside the pre-defined area of the shutter is substantially greater than the light transmission of the shutter in its open state.

13. A display system enabling a user to view a light emitting display and an ambient environment simultaneously, the display comprising for each of the eyes of a user:
   a light-transmissive block allowing the transmission of light from the ambient environment to the user's eye through the block from a first surface to a second surface opposing said first surface;
   a light emitting display located on a third surface of the block, the third surface being substantially perpendicular to said first and second surfaces;
   a beam splitter having a plane surface arranged at substantially 45 degrees to said first and second surfaces, so as to reflect light from the light emitting display through the second surface; and
   a shutter located on said first surface, adapted to block, within a pre-defined area, the transmission of light from the ambient environment to the user's eye, for providing a dark background for the light emitting display, wherein the shutter is addressable for varying a level of light transmission into the light-transmissive block, having a plurality of addresses, wherein each address varies the level of light transmission according to a corresponding address of the light emitting display.

14. A display comprising:
   a light-transmissive block having a first surface and a second surface opposing said first surface;
   a light emitting display located on a third surface of the block, the third surface being substantially between the plane of the first surface and the plane of the second surface and perpendicular to said first and second surfaces;
   a beam splitter having a plane surface arranged at substantially 45 degrees to said first, said second surface, and said third surface for reflecting an image projected from the light emitting display to the second surface; and
   an addressable shutter of said first surface, for varying a level of light transmission into the light-transmissive block, having a plurality of addresses, wherein each address varies the level of light transmission according to a corresponding address of the light emitting display.

* * * * *